(12) United States Patent
Behnam

(10) Patent No.: US 8,377,494 B2
(45) Date of Patent: Feb. 19, 2013

(54) CONCENTRATES OF ACTIVE AGENTS, SUCH AS W-3 FATTY ACIDS, AND POLYSORBATE

(75) Inventor: Dariush Behnam, Rossdorf (DE)

(73) Assignee: Aquanova AG, Darmstadt (DE)

( * ) Notice: Subject to any disclaimer, the term of this patent is extended or adjusted under 35 U.S.C. 154(b) by 639 days.

(21) Appl. No.: 10/579,974

(22) PCT Filed: Jul. 22, 2004

(86) PCT No.: PCT/EP2004/008175
§ 371 (c)(1), (2), (4) Date: May 23, 2006

(87) PCT Pub. No.: WO2006/010370
PCT Pub. Date: Feb. 2, 2006

(65) Prior Publication Data
US 2007/0148309 A1    Jun. 28, 2007

(51) Int. Cl.
*A23D 7/00* (2006.01)
(52) U.S. Cl. .............. 426/602; 426/601
(58) Field of Classification Search .......... 426/601, 426/602
See application file for complete search history.

(56) References Cited

U.S. PATENT DOCUMENTS

| | | | | |
|---|---|---|---|---|
| 3,052,608 | A * | 9/1962 | Hirsh | 514/785 |
| 6,444,253 | B1 * | 9/2002 | Conklin et al. | 426/651 |
| 2004/0081670 | A1 | 4/2004 | Behnam | |
| 2004/0142038 | A1 * | 7/2004 | Echols et al. | 424/486 |

FOREIGN PATENT DOCUMENTS

| | | |
|---|---|---|
| DE | 101 03 454 A1 | 8/2002 |
| DE | 101 08 614 A1 | 9/2002 |
| DE | 103 06 177 A1 | 9/2004 |
| EP | 1 475 083 A1 | 11/2004 |

OTHER PUBLICATIONS

Stecher, Paul et al. 1968, The Merck Index $8^{th}$ edition, Merck & Co., Inc., Rahway, New Jersey. p. 848-849 & 973.*
Polysorbate in Wikipedia [online][retrieved on Jan. 6, 2010] [Google search].*
Hui, Y. 1996. Baileys Industiral Oil and Fat Products. $5^{th}$ edition, vol. 1, John Wiley & Sons, Inc., New York. p. 162-164, 444-445, 484-485.*
Spernath A., et al., "Food grade Microemulsions based on nonionic emulsifiers: Media to enhance Lycopene Solubilization," Journal of Agricultural and Food Chemistry, American Chemical Society, Washington, U.S., vol. 50, No. 23, 2002, pp. 6917-6922 (Abstract Only).

* cited by examiner

*Primary Examiner* — Carolyn Paden
(74) *Attorney, Agent, or Firm* — Jacobson Holman PLLC

(57) ABSTRACT

The invention relates to the processing of substances that are not soluble, or soluble with difficulty, in water, in such a manner that, introduced into water or oil, these substances can yield a clear solution and can be easily integrated with finest homogeneous distribution into foodstuff, cosmetics, pharmaceuticals, and nutrient solutions. To achieve that, the invention provides a concentrate, consisting of an active substance from the group, which includes an algae oil, an essential oil, a terpene, phosphatidylserine, an ω 3 fatty acid, lanolin, a linoleic acid triglyceride, citral or tea tree oil, and a surplus amount of a polysorbate with at least two and half times the weight of the active substance.

16 Claims, No Drawings

CONCENTRATES OF ACTIVE AGENTS, SUCH AS W-3 FATTY ACIDS, AND POLYSORBATE

This is a nationalization of PCT/EP2004/008175 filed 22 Jul. 2004 and published in German.

BACKGROUND OF THE INVENTION

In the processing for the integration of active agents and additives in the end products in the foodstuff, cosmetic and pharmaceutical sector as well as in the nutrient solutions for cells or bacterial cultures, stable, homogeneous, fine distribution of the active agents or additives in the respective end product stands in foreground due to reasons of production technology, safety and practicability in the applications, compliance with the legal regulations as well as visual appearance.

Besides the stability of the homogeneity, which must often be guaranteed for several years, optimally fine distribution of the active substances or additives in smallest volume units of the respective end products plays a decisive role. The integration of the water soluble active agents or additives in the water-containing end products is in general possible with finest distribution of particles.

In contrast to that the integration of the active agents or additives, which are fat-soluble and are not soluble, or soluble with difficulty, in water, into the end products represents, a problem from the physical viewpoint, because such active agents or additives can be integrated in the end products for the purpose of achieving homogeneous distribution only after the corresponding time-consuming and elaborate matrix design (oil/oil mixture or oil/water emulsion).

In order, for instance, to integrate, a fat-soluble substance such as retinol or beta carotene (daily requirement about 2 mg/day) into a quantity of the end product, which is consumed or applied in a day, the volume of these small quantities of retinol or P-carotene must be increased through undesirable addition of a disproportionately large quantity of oil, so that an optimally homogeneous distribution can be ensured in the end product.

However, this expansion of the volume, undesirable but necessary due to physical reasons, of the aforementioned substances for the purpose of achieving homogeneous distribution in the end products is technologically essential both in the foodstuff as well as in the cosmetic and pharmaceutical products.

The oil-water emulsion of these substances for the purpose of integration into the end products is not less elaborate, whereby, due to the particle size of at least 1μ in the emulsion, no optimally fine distribution in the end product is possible. Apart from the fact that the substances that are not soluble, or soluble with difficulty, in water, lead to problems in the processing for reasons mentioned above, and can result in poor homogeneity, these substances, incorporated in oil/oil mixtures or oil/water emulsions, can be resorbed only to a limited extent.

SUMMARY OF THE INVENTION

The underlying problem of the invention is to integrate substances that are not soluble in water, or soluble in water with difficulty, so that, following their addition into water or oil, they give a clear solution and can be integrated in foodstuff, cosmetic, pharmaceutical or nutrient solutions with finest homogeneous distribution.

To that end, the intention of the invention is to provide a concentrate, which consists of an active agent from the group, comprising an algae oil, an essential oil, a terpene, phosphatidylserine, a co-3-fatty acid, lanolin, conjugated linoleic acid triglyceride, a citral and tea tree oil and a surplus of polysorbate. Possibly addition of glycerol to the mixture may also come in question. Especially preferred is the use of polysorbate 80, however, in the essential oils, of polysorbate 20. The concentrates, according to the invention, of the substances, for which the preferred compositions are given in detail in the dependent claims, have proved to be very effective and reliable.

DETAILED DESCRIPTION OF THE INVENTION

Concentrates according to the invention that are without moisture but soluble in water, can be obtained, for example, by mixing the relevant active agent with a surplus of polysorbate 80 or polysorbate 20 and stirring the mixture until it is clear. To accelerate the mixing process, it is recommended to heat the mixture to a temperature of approximately 80° C. to approximately. 100° C.

The active agent is micelled in this manner, whereby the individual micelles have a size of not greater than about 40 nm. With this micelling, the resorption and the penetration of the substance uptake in the respective digestive tract or skin is substantially enhanced. The concentrates according to the invention are easily soluble in water. To accelerate the dissolution into water, it is recommended to stir water, mildly heated to approximately 40° C., into the concentrate.

The concentrates according to the invention find application as additives to foodstuffs, in particular to non-alcoholic drinks, in cosmetic products as additives to salves and similar personal hygiene products, as additives to pharmaceutical preparations or nutrient solutions.

The invention is explained on the basis of the following exemplary instances.

EXAMPLE 1

Algae Oil Solubilizate

Material
a) An algae oil with proportion of about 45% of DHA (ω3-fatty acid C 22:6) according to the following DHActive Specifications:
General Characteristics

| Description: | Vegetable oil from microalgae, containing approx. 45% docosahexaeaoic acid(DHA) |
|---|---|
| Composition: | Triacyiglycerols (>95%) |
| Appearance: | Light waxy to fluid |
| Color: | Light yellow |
| Odor: | Characteristic |
| Taste: | Characteristic |
| Fatty Acid Composition | |
| 22:6 | DHA 43-50% |
| Chemical Characteristics | |
| Free fatty acids | <0.1% |
| Peroxide value | <5.0 meq./kg |
| Unsaponifiables | <2.0% |
| Miscellaneous | |
| Proteins | <0.1% |
| Hexane | <1.0 ppm |

| Elemental composition | |
|---|---|
| Arsenic | <0.5 ppm |
| Lead | <0.1 ppm |
| Mercury | <0.5 ppm |

Antioxidant

Mixed natural tocopherols (1000 ppm added)

b) Polysorbate 80

160 g algae oil is mixed with 804 g polysorbate 80 until the mixture is clear or has homogeneous distribution and stirred until it is clear. To accelerate the mixing process, the mixture is heated up to approximately 80° C. The solubilizate prepared in this manner contains 7% w/w of DHA (=docosahexaenoic acid). After completion of the mixing process, the mixture is cooled again and filled flushing it with nitrogen with exclusion of air oxygen and packed. If a polysorbate other than polysorabate 80 is used, the mixing ratio necessary for achieving the desired clearness of the mixture changes.

The solubilizate prepared in this manner can be dissolved in water giving a stable and clear solution. To accelerate the process of the dissolution into water, the concentrate and the water can preferably be heated to approximately 40° C. to approximately. 45° C. 2 g of this solubilizate covers the daily requirement of DHA (ω-3-fatty acid).

In place of algae oil, an ω-3-fatty acid containing animal fat, for example, one with 50% w/w DMA (docosahexanoic acid=C22:6), 10 w/w % EPA (eicosapentaenoic acid=C20:5) and 20 w/w % DPA (docosapentaenoic=C22:5n3). In the latter case, 210 g of this animal fat and 790 g of polysorbate 80 are processed into a concentrate as described above for algae oil. A water-soluble concentrate prepared in this manner contains 12% w/w of ω-3-fatty acids. To dissolve this concentrate in water, the concentrate must be first diluted with water at approximately 45° C. in ratio by weight of about 1:2. After the solution becomes clear, it can be arbitrarily diluted without impairment of the clearness. 1.2 g of this concentrate covers the daily requirement of ω-3-fatty acids.

If a polysorbate other than polysorbate 80 is used, the proportions by weight of the concentrate change for achieving the desired clearness.

EXAMPLE 2

Essential Oil Solubilizte

Material:

a) A natural orange oil named NATURE and obtained from the company Tutto Bianco, and having the following characteristics, as provided by the manufacturer "NATURE Der grüne Zweig von TUTTO BIANCO".

| 1. | Product: | |
|---|---|---|
| 1.1 | Article No.: | A087 |
| 1.2 | Charge No.: | V003022 |
| 1.3 | Trade name: | Orange oil sweet |
| 1.4 | Origin: | Brazil |
| 1.5 | Synonym: | *Aurantii dulcis* aetheroleum |
| 1.6 | Pharmacopoeia: | BP |
| 2. | Properties: | |
| 2.1 | Color: | Clear, brownish yellow to reddish brown |
| 2.2 | Odor: | Like sweet orange |
| 2.3 | Taste: | Mild and aromatic |
| 2.4 | Consistency: | Fluid |
| 3. | Identity | |
| 3.1 | Gas chromatography: | see below |
| 4. | Purity | |
| 4.1 | Soluble in ethanol 90% | 1:7 v/v not always clearly soluble |
| 4.2 | Miscible with | |
| 4.3 | Relative density 20° C. | 0.8460 |
| 4.4 | Refractive index 20° C. | 1.4730 |
| 4.5 | Optical rotation 20° C. | +95° |
| 4.6 | Acid number | 1 |
| 4.7 | Alkaline and acidic reacting substance | |
| 4.8 | Ester number | |
| 4.9 | Saponification number | |
| 4.10 | External esters | corresponding |
| 4.11 | Fatty oils | corresponding |
| 4.12 | Resinified essential oils | corresponding |
| 4.13 | Water soluble proportion | corresponding |
| 4.14 | Nonvolatile proportion | 3% (= evaporation residue) |
| 4.15 | Solidification point | |
| 4.16 | Organic halogen compounds | not detectable |
| 4.17 | Heavy metals | not detectable |
| 4.18 | Aldehyde content | 2% |

| Analysis results of Gas Chromatography: | |
|---|---|
| 0.5693% | n-Decylaldehyde |
| 0.3359% | Anthranilic acid |
| 2.0178% | Myrcene |
| 95.757% | D$^+$ Limonene |
| 0.4646% | Linalool | b) Polysorbate 20

An essential oil, such as, for instance, 100 g orange oil, is stirred with 900 g polysorbate 20, until the mixture becomes clear or has homogeneous distribution. To accelerate the mixing process, the mixture can be heated, for instance, up to 80° C. A 10% orange oil concentrate prepared in this manner can be dissolved in water in any arbitrary mixing ratio. In order to accelerate the mixing process with water, the concentrate can be introduced into water heated to about 40° C. and dissolved.

If one can do without clearness and the solubilizate can be used for other applications such as, for instance, for clear non-alcoholic drinks, the ratio by weight of the essential oil to polysorbate 20 can be adjusted, for instance, to 3:7. If a polysorbate other than polysorbate 20 is used, the proportions by weight in the concentrate necessary for achieving the required clearness change.

Orange oil concentrate with higher concentration is obtained, if about 850 g of polysorbate 20 are heated to about 50° C. to about 60° C. and in this warm polysorbate 20, about 150 g of the aforementioned orange oil is integrated under stirring. It is recommendable to heat the mixture again to about 85° C. and stir it until it is transparent. The 15% orange oil concentrate thus obtained has light orange-yellow color, it is transparent and viscous and has a distinct orange odor. To obtain an aqueous solution of this concentrate, the best procedure is to stir with water at about 37° C. A concentrate heated to this temperature can easily be processed as desired.

In analogous manner, orange oil concentrates with 10% w/w and 15% w/w can be prepared, if the respective introduced quantity of polysorbate 20 is changed accordingly and possibly stirred under mild heat. The concentrates can be used as a flavor in the production of ice cream, chewing gum and in food supplements.

The orange oil serves here solely as an example of an essential oil. In place of orange oil, other essential oils, such as, for example, tea tree oil can be used and solubilized:

Material:

a) Tea tree oil (MELALEUCA ETHEROLEUM) according to the following Analysis of "NATURE Der grüne Zweig von TUTTO BIANCO".

MEAN RESULTS OF THE ANALYSIS

| 1. | Product | |
|---|---|---|
| 1.1 | Trade name: | Tee tree oil |
| 1.2 | Article number: | A113 |
| 1.3 | Synonym: | *MELALEUCA* |
| | Synonym: | ETHEROLEUM |
| 1.4 | Pharmacopoeia: | Ph-Eur-4.01 |
| | EIEECS No. 85085-46-9; CTFA: | Tea Tree Oil |
| | *Melaleuca alternifolia* | |
| 2. | Properties | |
| 2.1 | Color: | colorless to weakly yellowish |
| 2.2 | Odor: | terpene like characteristic |
| 2.3 | Taste | |
| 2.4 | Consistency: | clear, liquid |
| 3. | Purity | |
| 3.1 | Soluble in ethanol v/v% | |
| 3.2 | Miscible with: | Ethanol 96%, ether, fatty oils |
| 3.3 | Relative density 20 degrees C. | 0.8950 |
| 3.4 | Refractive index 20 degrees C. | 1.4790 |
| 3.5 | Optical rotation 20 degrees C. | +10° |
| 3.23 | Shelf life after delivery dale: | 24 months |
| 3.24 | Store with protection against light/air/heat | |
| 3.25 | Origin: | Australia |
| 4. | Identity | |
| 4.1 | Chromatographic profile | corresponding |
| 4.2 | Analysis results | corresponding |
| 4.3 | CHARGE No. | 040051 |
| | Allergenes contained in the natural ingredients: | |
| | 3% d-Limonene | |
| | AS-No.: 5989-27-5 | Einecs-No: 227-813-5 | b) Polysorbate 20

About 700 g of polysorbate 20 are heated to between approximately 50° C. to approximately 60° C. About 300 g of tea tree oil is stirred into the warm polysorbate. The mixture is heated to approximately 85° C. and stirred until the concentrate becomes clear: The concentrate is transparent at room temperature, viscous and smells like tea tree oil. This 30% tea tree oil concentrate is water soluble.

To improve the solubility, it is recommendable to stir the concentrate in about 40° C. warm water, following which a clear aqueous solution of the concentrate is obtained.

If a different polysorbate is used, the quantity of polysorbate and tea tree oil must be changed to obtain a clear concentrate.

EXAMPLE 3

γ-Terpine Solubilizate

Material:

a) γ-terpines, having the following properties:
Date: Nov. 2, 2003
Article number: 8039
Product: γ-terpines ROTICHROM® GC
Charge: 43256376
Density: 0.849
Formula: $C_{10}H_{16}$
Melting point: Flashpoint: 51° C.
CAS Number: 99-85-4
Molecular weight: 136.24
Storing temperature: +4"C
Boiling point: 182° C.
Project: defproj
Instrument: channel4
Analysis: roth4
Sample: Gamma-terpines
  Injection: 1

Peak Information

| Uncorrected | RT | Area | Area & Peak Name |
|---|---|---|---|
| 12.39 | 14.30 | 0.28 | |
| 13.94 | 5031.02 | 91.28 | |
| 14.25 | 39.39 | 0.71 | |
| 14.60 | 255.73 | 4.64 | |
| 17.02 | 15.04 | 0.27 | |
| 18.59 | 8.25 | 0.15 | |
| 18.73 | 5.28 | 0.10 | |
| 19.05 | 20.79 | 0.38 | |
| 20.10 | 8.72 | 0.15 | |
| 20.20 | 5.17 | 0.09 | |
| 20.38 | 15.53 | 0.28 | |
| 20.77 | 7.72 | 0.14 | |
| 21.70 | 2.92 | 0.05 | |
| 23.84 | 9.36 | 0.17 | |
| 24.52 | 4.11 | 0.07 | |
| 24.89 | 17.30 | 0.31 | |
| 25.15 | 4.80 | 0.09 | | b) Polysorbate 80

70 g of γ-terpines are mixed with 930 g polysorbate 80 and stirred until a clear and homogeneous distribution is obtained. To accelerate the mixing process, the mixture can be heated, for example to up to 80° C. A 7% γ-terpine concentrate can be dissolved in water to obtain a clear and stable solution. To accelerate the dissolution process, the concentrate can be stirred in warm water at about 40° C.

Use of a different polysorbate, which is basically possible, requires a different distribution by weight in a concentrate of γ-terpines and polysorbate.

EXAMPLE 4A

Phosphatidylserin Solubilizate

| Material: |
|---|
| a) Phosphatidylserine powder (LECI - PS 90 ON of Degussa) |
| Characteristics: |
| LECI ®-PS 90PN is a specially processed, |
| phosphatidyl-serine-enriched, powdered |
| soybean lecithin for use in nutritional |
| supplements. |
| Composition: |
| Phosphatidylserine and small amounts of other |
| Phospholipids, having the following fatty |
| acid distribution |

| | |
|---|---|
| saturated fatty acids: | 16-22% |
| monounsaturated fatty acids: | 9-14% |
| polyunsaturated fatty acids: | 62-71% |
| of which: | |
| linoieic acid: | 57-65% |
| linolenic acid: | 5-8% |
| Specification: | |

-continued

| Material: | |
|---|---|
| Phosphatidylserine (PS): | 88-92% |
| lyso-Phosphatidylserine (LPS): | max. 1% |
| Phosphatidylcholine (PC): | max. 2% |
| Phosphatide acid (PA): | max. 5% |
| moisture: | max. 1.5% |
| peroxide value: | max. 5 |
| Microbiological Data: | max. 1000/g |
| total plate count: | max. 50/g |
| yeasts: | max. 50/g |
| moulds: | negative/g |
| coliforms: | negative/g |
| e-coli: | negative/g |
| staphylococcus aureus: | negative/g |
| salmonellae: | negative/50 g |
| b) Polysorbate 80 | |
| c) Glycerol 85% | |

80 g phosphatidylserine powder is mixed with 510 g polysorbate 80 and 410 g of glycerol and stirred until a clear solution with homogeneous distribution is obtained, and heated during the stirring to about 90° C. 7.2% phospatidylserine concentrate prepared in this manner, heated to about 40° C., can be dissolved into a clear and stable solution.

EXAMPLE 4B

Phosphatidylserine Solubilizate

| Material: | |
|---|---|
| a) Phosphatidylserine powder (LECI - PS 20 F of Degussa) | |
| Characteristics: | |
| LECI(D-PS 20 F is a specially processed, phosphafidylserine enriched, liquid soybean lecithin combined with medium chain triglycerides for nutritional supplements. | |
| Composition: | |
| Mixture of non-polar (triglycerides) and polar (phospho- and glyco-) lipids, medium chain triglycerides (MCT) and a small amount of carbohydrates, having the following fatty acid distribution | |
| saturated fatty acids: | 44-50 |
| monounsaturated fatty acids: | 6-9 |
| polyunsaturated fatty acids: | 40-48 |
| of which: | |
| linoleic acid: | 36-42 |
| linolenic acid: | 3-6 |
| Specification: | |
| Phosphatidylserine (PS) | 18-24% |
| Phosphatidylcholine (PC) | min. 14% |
| Phosphatidylethanolamine (PE) | max. 3% |
| Phosphatidyd'nositol (PI) | max. 2% |
| moisture | max. 1% |
| iodine color value (10% in toluene) | max. 55% |
| viscosity (25° C.) | max. 10.0 Pas |
| peroxide value | max. 5 |
| toluene insolubles | max. 0.3% |
| Microbiological Data: | |
| total plate count: | max. 1000/g |
| yeasts: | max. 100/g |
| moulds: | max. 100/g |
| coliforms: | negative/g |
| e-coli: | negative/g |
| staphylococcus aureus: | negative/g |
| salmonellae: | negative/25 g |
| b) Polysorbate 80 | |
| c) Glycerol 85% | |

150 g of oily/viscous phosphatidylserine is mixed with 600 g polysorbate 80 and 250 g glycerol and stirred until a clear and homogeneous distribution is obtained and during the stirring heated to about 90° C. A 3.3% phosphatidylserine concentrate prepared in this manner can be dissolved in water to give a clear solution. To accelerate the process of dissolution into water, the water can be heated, for instance, to 40° C.

When a different polysorbate is used, the mixing ratio of the ingredients must be changed to obtain a clear concentrate.

EXAMPLE 5

Lanolin Solubilizate

Material:
a) Lanolin (wax), Product No. 259543 of the firm Sigma-Aldrich
b) Polysorabate 80

50 g lanolin is mixed with 950 g polysorbate 80 and it is stirred while increasing the temperature of the mixture to about 100° C. until a clear and homogeneous distribution is obtained. The concentrate obtained in this manner contains 5% w/w lanolin. This 5% lanolin concentrate can be dissolved in water to a clear and stable solution. The dissolution is accelerated if the concentrate is added to water heated to about 40° C. and stirred.

EXAMPLE 6

Linoleic Acid Triglyceride Solubilizate

| Material: | |
|---|---|
| a) Conjugated linoleic acid triglyceride, marketed by the firm Grünau Illertissen GmbH under the brand name Selin CLA-TG. | |
| General Information | |
| Triglyceride on basis of conjugated linolcic acid | |
| Composition | |
| Product Description | |
| Color: | slightly yellow |
| Odor/Taste: | neutral - oily |
| Delivery form: | liquid |
| Specification | |
| Provisional specifications: | |
| Acid number: | max, 3 |
| Iodine number: | 115-127 |
| Hydroxyl number: | max. 10 |
| Water content: | max. 0.2% |
| Unsaponifiable: | max. 1% |
| Fatty acid spectrum: | |
| <C16 | max. 1% |
| C16:1 | max. 1% |
| CI8 max. | 3% |
| C18:1 | 19-34% |
| CI8:2 conj. | 58-67% |
| C18:2 | 2-9% |
| CI8:3 | max. 1% |
| >C13 | max. 1% |
| Additional information | |
| The use of conjugated linoleic acid (Selin ® CLA) or conjugated linoleic acid triglyceride (Selin ® CLA-TG) as a food supplement belongs largely to freely available state of the an. | |
| All the same, the GRÜNAU ILLERTISSEN GmbH feels it as its duty to draw the attention of its customers to the following Industrial Property Rights of the Wisconsin Alumni Research Foundation (WARF); | |
| b) Polysorbate 80 | |

50 g of oily, viscous linoleic acid triglyceride is mixed with 950 g polysorbate 80 and stirred at temperature of about 100° C. until clear and homogeneous distribution of the components is obtained. The concentrate prepared in this manner contains 5% w/w of the mentioned active substance. The concentrate can be dissolved in water to a give clear and homogeneous solution. The dissolution process is accelerated, if it is dissolved in water at about 40° C. for instance.

Use of a different polysorbate, possible in principle, requires change in the weight proportions of the components of the concentrate. Regarding the importance of the conjugated linoleic acid triglyceride, reference is made to the document EP-B-579 901.

EXAMPLE 7

Citral Solubilizate

Material:
a) Citral (Degussa, Lot No. 1000103751)
b) Polysorbate 20
c) Ethanol

At first, about 430 g of polysorbate 20 are heated to about 50° C. to 60° C. In the hot polysorbate, about 70 g oily citral is introduced and stirred and during the stirring, the temperature of the mixture is increased to 85° C. The mixture is stirred at this temperature until it becomes homogenous. Thereafter about 500 g 96% ethanol is added to the cold mixture. The concentrate obtained in this manner is transparent, viscous and develops a mild lemon like odor. The concentrate contains about 7% w/w citral.

The concentrate is water soluble; to accelerate the process of dissolution, it is recommended to heat the water to about 40° C.

To prepare a 14% citral concentrate, in about 860 g of polysorbate 20, heated to about 50° C. to about 60° C., about 140 g of oily citral is added. After stirring it in completely, the temperature of the mixture is increased during the stirring to about 85° C., and the stirring is continued further, until a clear and homogeneous mixture is visible. After cooling, one obtains a transparent, viscous 14% citral concentrate with mild lemon like odor, which is soluble in water. Here also, the dissolution into water is accelerated, if water is heated mildly to about 40° C.

The invention claimed is:

1. A concentrate consisting of:
an algae oil containing an ω-3 fatty acid, and
a surplus amount of polysorbate, wherein the ratio of ω-3 fatty acid to polysorbate is no greater than 2:5 by weight,
wherein the ω-3 fatty acids are micelled such that the individual micelles have a size not greater than about 40 nm, and wherein the concentrate is clear.

2. A method for preparation of a concentrate according to claim 1, comprising mixing w-3 fatty acid with a surplus of polysorbate until a clear mixture is obtained.

3. The method according to claim 2, in which the mixture is heated to a temperature of about 80° C. to about 100° C.

4. The concentrate according to claim 1, wherein the weight ratio of ω-3 fatty acid to polysorbates is no greater than 1:6.

5. The concentrate according to claim 1, wherein the polysorbate is polysorbate 80.

6. The concentrate according to claim 1, wherein the polysorbate is polysorbate 20.

7. The concentrate according to claim 1, wherein the polysorbate is polysorbate 20.

8. A concentrate consisting of:
an animal fat containing an ω-3 fatty acid, and
a surplus amount of polysorbate 80,
wherein the ω-3 fatty acids are micelled such that the individual micelles have a size not greater than about 40 nm, and wherein the concentrate is clear,
and further wherein the concentrate consists of 21% by weight of an animal fat containing ω-3 fatty acid and 79% by weight of polysorbate 80.

9. A concentrate consisting of:
an algae oil containing a mixture of ω-3 fatty acids, and
a surplus amount of polysorbate, wherein the ratio of ω-3 fatty acid to polysorbate is no greater than 2:5 by weight,
wherein the ω-3 fatty acids are micelled such that the individual micelles have a size not greater than about 40 nm, and wherein the concentrate is clear.

10. The concentrate according to claim 9, wherein the weight ratio of ω-3 fatty acid to polysorbates is no greater than 1:6.

11. The concentrate according to claim 9, wherein the polysorbate is polysorbate 80.

12. A concentrate consisting of:
an animal fat containing an ω-3 fatty acid, and
a surplus amount of polysorbate, wherein the ratio of ω-3 fatty acid to polysorbate is no greater than 2:5 by weight,
wherein the ω-3 fatty acid is micelled such that the individual micelles have a size not greater than about 40 nm, and wherein the concentrate is clear.

13. The concentrate according to claim 12, wherein the polysorbate is polysorbate 20.

14. A concentrate consisting of:
an animal fat containing a mixture of ω-3 fatty acids, and
a surplus amount of polysorbate, wherein the ratio of ω-3 fatty acid to polysorbate is no greater than 2:5 by weight,
wherein the ω-3 fatty acid is micelled such that the individual micelles have a size not greater than about 40 nm, and wherein the concentrate is clear.

15. The concentrate according to claim 14, wherein the weight ratio of ω-3 fatty acid to polysorbates is no greater than 1:6.

16. The concentrate according to claim 14, wherein the polysorbate is polysorbate 80.

* * * * *